United States Patent [19]

Frazier et al.

[11] Patent Number: 5,651,075
[45] Date of Patent: Jul. 22, 1997

[54] AUTOMATED LICENSE PLATE LOCATOR AND READER INCLUDING PERSPECTIVE DISTORTION CORRECTION

[75] Inventors: James F. Frazier, Pacific Palisades; Craig C. Reinhart, Moorpark, both of Calif.; James F. Alves, Tucson, Ariz.

[73] Assignee: Hughes Missile Systems Company, Los Angeles, Calif.

[21] Appl. No.: 521,197

[22] Filed: Aug. 30, 1995

Related U.S. Application Data

[63] Continuation of Ser. No. 160,504, Dec. 1, 1993, abandoned.

[51] Int. Cl.$^6$ .................................................. G06K 9/00
[52] U.S. Cl. ........................................... 382/105; 382/278
[58] Field of Search ................................. 348/148, 149; 340/933, 937; 382/105, 177, 199, 209, 278, 291, 293

[56] References Cited

U.S. PATENT DOCUMENTS

| | | | |
|---|---|---|---|
| 4,567,609 | 1/1986 | Metcalf | 382/9 |
| 4,817,166 | 3/1989 | Gonzalez et al. | 382/1 |
| 4,878,248 | 10/1989 | Shyu et al. | 382/9 |
| 5,020,113 | 5/1991 | Lo et al. | 382/42 |
| 5,081,685 | 1/1992 | Jones, III et al. | 382/1 |
| 5,136,658 | 8/1992 | Mori | 382/1 |
| 5,204,675 | 4/1993 | Sekine | 340/933 |
| 5,315,664 | 5/1994 | Kumagai | 382/1 |

FOREIGN PATENT DOCUMENTS

| | | | |
|---|---|---|---|
| 3-224100 | 10/1991 | Japan | 340/937 |
| 3-232100 | 10/1991 | Japan | 340/937 |
| 6-274788 | 9/1994 | Japan | G08G 1/017 |
| 7-85211 | 3/1995 | Japan | G06K 9/00 |
| 2227866 | 8/1990 | United Kingdom | 340/937 |
| 87/07057 | 11/1987 | WIPO | 382/1 |

OTHER PUBLICATIONS

Elektronik vol. 40, No. 18, 3 Sep. 91, pp. 52–57, XP000262260 Weil, H. G. et al: "Bildverarbeitung: Die 3, Dimension Erschliessen Gekruemmte Flaechen Oder Ringformige Schriften Ohne Probleme".

Autofact Conference Proceedings, 1 Jan. 1989, pp. 33–44; XP000566793 Akio Shio: "Character Recognition in Scene Images".

English Translation of: Japanese Kokai No. 3-224100 to Urata et al., Oct. 1991.

English Translation of: Japanese Kokai No. 3-230100 to Hasegawa et al., Oct. 1991.

*Primary Examiner*—Andrew Johns
*Attorney, Agent, or Firm*—Charles D. Brown; Wanda K. Denson-Low

[57] ABSTRACT

An automated license plate locator and reader (10) which provides novel methods for 1) correcting for perspective distortion (16), 2) locating the license plate (20), 3) reading the license plate (22) and 4) improving the confidence rating of the output signal (228). The novel method for accommodating a wide range of viewing geometries involves warping the image to eliminate perspective distortion of the plate resulting from roadside camera placement. The novel method for locating plates involves correlating an "idealized" edge template of a license plate with an edge-enhanced version of the image. Edge enhancement and shadow reduction is achieved by applying a Laplacian operator over the input image. Performance is further improved by filtering out distracting edges within the resulting correlation surface and then locating the highest peaks within this filtered correlation surface. The location of the highest peaks provides the location of the plate. The novel method for reading the license plates involves performing a modified binary correlation of an image of the plate with reference characters to provide output signals indicative of the symbols on the plate. This output is correlated with valid license plate signals to improve the confidence rating thereof.

14 Claims, 6 Drawing Sheets

AUTOMATED LICENSE PLATE LOCATOR AND READER INCLUDING PERSPECTIVE DISTORTION CORRECTION

This is a continuation application Ser. No. 08/160,504 filed Dec. 1, 1993 now abandoned.

BACKGROUND OF THE INVENTION

1. Field of the Invention

The present invention relates to image processing and recognition systems. More specifically, the present invention relates to license plate locators and readers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

For many applications, there is a need for a system for reading a license plate of a motorized vehicle. One such application involves the automated monitoring of traffic flow to identify vehicles traveling at excessive speeds. Another application involves the automatic identification of vehicles passing through toll booths without payment of the toll.

Many systems are known in the art for reading license plates. See, for example, "Development and Application of Vehicle-license Number Recognition System Using Real-time Image Processing", by K. Kanayama et al, published in *Systems and Computers in Japan*, vol 22, no. 1, p. 49–58, 1991.; "Automated License Plate Reading", by L. Howington, published in *Advanced Imaging*, September 1989; "Character Recognition in Scene Images", by A. Shio, *Proceedings of AUTOFACT '89*, Detroit Mich., 1989; "A Method of License Plate Extraction Using a Fast Pyramid Hierarchical Hough Transformation", by T. Agui, H. Jin Choi, and M. Nakajima, *Systems and Computers in Japan*, vol 19, no. 8, pp. 69–76, 1988; and "Gray Scale Image Processing Technology Applied to Vehicle License Number Recognition System", by M. Takatoo et al., published in *Proceedings of the IEEE International Workshop on Industrial Applications of Machine Vision and Machine Intelligence*, pp. 76–79, Tokyo, Japan, 1987.

See also the following patents, "License Plate Recognition System for Moving Car", pat. no. GB 2246894; "License Plate Character Recognition Apparatus", pat. no. GB 2217498 and U.S. Pat. No. 4,878,248; "Character Recognition System for e.g. Vehicle Number Plate Monitoring", U.S. Pat. No. 4,567,609; "Apparatus and Method for Reading a License Plate", U.S. Pat. No. 5,081,685; Finding and Identifying Apparatus for Image of Car License Plate", WO 8707057, U.S. Pat. No. 4,817,166, EP 310611, JP 1502371.

In addition, Computer Recognition Systems of Massachusetts and Perceptics of Knoxville, Tenn. manufacture and sell automated license plate recognition systems which represent the current state of the art.

As is evident from these references, conventional license plate reading systems separate the pixels of the image of the plate that makeup characters from the pixels of the image that create background imagery. Each of the segmented pieces is then analyzed to determine what type of character (e.g. numeral or letter) is present based on the features in the image.

Unfortunately, the traditional correlation approaches utilized in conventional license plate reading systems have difficulty distinguishing between certain characters.

In addition, system design is complicated by the fact that the camera must be placed to the side of the road. This creates perspective distortion which forces a compromise. That is, to minimize perspective distortion, the camera must be placed at a distance from the vehicle of approximately fifty feet. Unfortunately, at lower traffic speeds and at this distance, the image of one vehicle is often blocked by a following vehicle.

Thus, there is a need in the art for a system and technique for reading license plates which has a high probability of correct read which accommodates perspective distortion.

SUMMARY OF THE INVENTION

The need in the art is addressed by the automated license plate locator and reader of the present invention. Several novel embodiments are disclosed by which the system of the invention 1) corrects for perspective distortion, 2) locates the license plate, 3) reads the license plate and 4) improves the confidence rating of the output signal.

The invention provides a novel method for accommodating a wide range of viewing geometries by warping the image to eliminate perspective distortion of the plate resulting from roadside camera placement.

In addition, the invention provides a novel method for locating plates by correlating an "idealized" edge template of a license plate with an edge-enhanced version of the image. Edge enhancement and shadow reduction are achieved by applying a Laplacian operator on the input image. Performance is further improved by filtering out distracting edges within the resulting correlation surface and then locating the highest peaks within this filtered correlation surface. The location of the highest peaks provides the location of the plate.

The invention provides a novel method for reading the license plates by performing a modified binary correlation of the image of the plate with reference characters to provide output signals indicative of the symbols on the plate. This output is correlated with valid license plate signals to improve the confidence rating thereof.

DESCRIPTION OF THE INVENTION

Illustrative embodiments and exemplary applications will now be described with reference to the accompanying drawings to disclose the advantageous teachings of the present invention.

Figure 1:
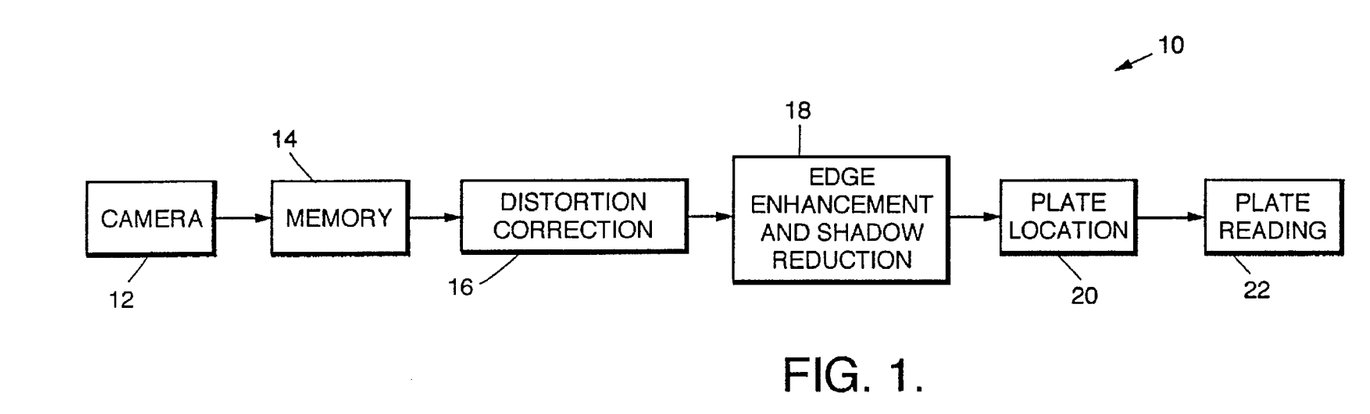
FIG. 1 is a block diagram of automated license plate recognition system of the present invention.

FIG. 1 is a block diagram of automated license plate recognition system of the present invention. The system 10 includes a conventional camera 12 which provides an image of a scene including a license plate mounted on the rear of a vehicle (not shown). Note that the present invention may be mounted to read and is capable of reading a license plate on the front of the vehicle as well as the rear.

The output of the camera constituting a frame of image data is stored in a memory 14. The perspective distortion in the stored image is mitigated by a distortion correction circuit 16. A Laplacian operator 18 provides edge enhancement affording shadow reduction and correction for uneven illumination in the distortion corrected image. A first correlation system 20 locates the license plate on the vehicle and a second correlator 22 reads and recognizes the symbols, numerals and characters on the plate in the manner described more fully below. A priori knowledge of valid license numbers is used to check the result before the final license number is output.

Figure 2:
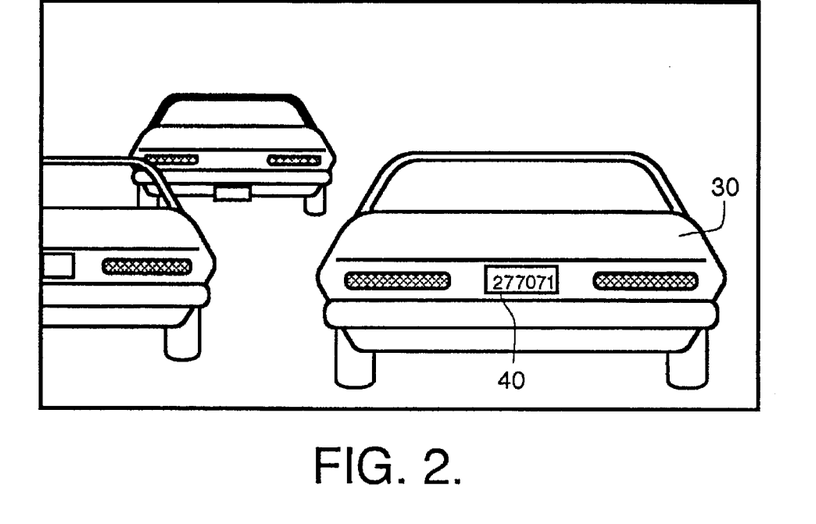
FIG. 2 illustrates a typical input image of the camera of a vehicle recognition system.

FIG. 2 illustrates a typical input image generated by the camera of a license plate recognition system. FIG. 2 shows a perspective view of a vehicle 30 with a license plate 40. The image should meet several requirements. Because correlation is used to locate and read license plate within each image, the system requires knowledge of the scale and rotation of the plate within the image. The scale (size) of the plate can be constrained to a known value by fixing the distance, at the time of image acquisition, between the vehicle and the camera. One method for achieving this is to acquire the image as the vehicle passes through an infrared light beam monitored by a sensor. The rotation (tilt) of the plate can be established as part of the initial set-up of the camera and is essentially the same for each vehicle.

Another requirement is that the image contain plates of the specific states(s) and year(s) specified by the user. This allows the system to search for and read specific types of plates within the image, which simplifies operation compared to systems that attempt to read plates of all states using feature-based character recognition schemes. Nonetheless, it is understood the present invention may be used to recognize plates of all states by simply providing reference characters for those states in the manner described below.

As discussed more fully below, the camera 12 is typically placed on the roadside such that the output thereof is an image with perspective distortion. Many of the processes essential to the location and reading of license plates degrade in performance in the presence of substantial perspective distortion. Unfortunately, the most desirable vehicle viewing geometries produce large amounts of perspective distortion. Correction of this distortion while still maintaining high levels of performance is necessary to take advantage of the more desirable viewing geometries.

Figure 3A:
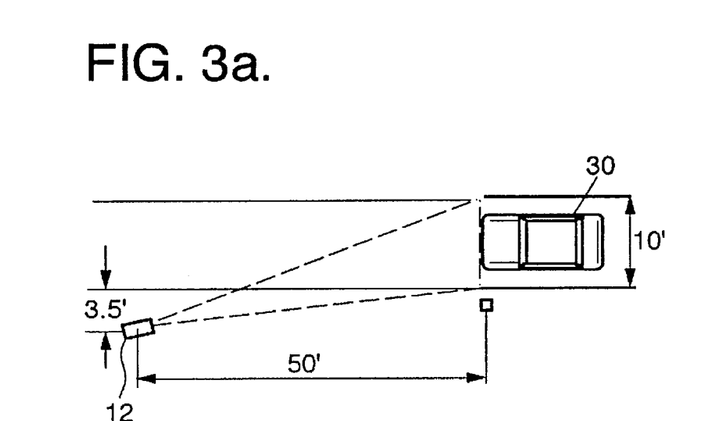
FIG. 3a illustrates minimum viewing distance without distortion correction.

For example, FIG. 3a illustrates minimum viewing distance without distortion correction. In a conventional license plate recognition system, a roadside camera 12 is placed 3.5 feet off the edge of the road 50 feet from a vehicle 30. The viewing geometry of FIG. 3a produces a change in plate width of approximately three to four pixels as the plate is moved from the left edge of the lane to the right edge. This is considered to be the marginal amount of perspective distortion above which the system will typically fail to successfully locate plates across the entire lane. The viewing geometry of FIG. 3b provides a much greater amount of distortion.

Figure 3B:
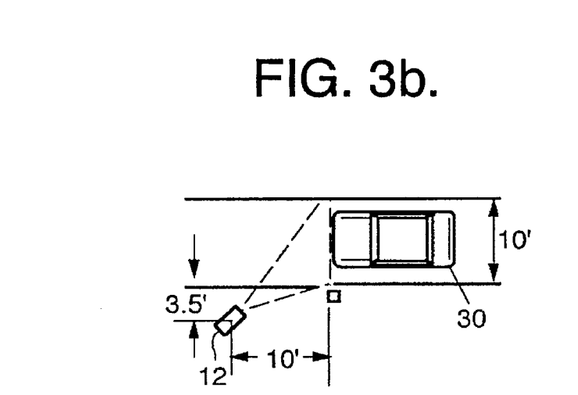
FIG. 3b illustrates acceptable viewing distance of a license plate recognition system with distortion correction as taught by the present invention.

FIG. 3b illustrates acceptable viewing distance of a license plate recognition system with distortion correction as taught by the present invention. By correcting this distortion, the camera can be placed at the side of a road approximately 10 feet behind the vehicle during imaging, as illustrated in FIG. 3b, as opposed to previous systems which required placement at approximately 50 feet or more behind the vehicle as illustrated in FIG. 3a. This allows for a shorter spacing between vehicles effectively allowing the system to read plates in traffic of lower speeds than previous systems as vehicles can follow each other more closely without the desired plate being obscured by a subsequent vehicle.

In accordance with the present teachings, perspective distortion correction is achieved by processing the input image in the distortion correction circuit 16 of FIG. 1. The distortion correction circuit 16 is a conventional digital image warping circuit. For more information on Warping, see *Digital Image Warping* by George Wolberg, published by IEEE Computer Society Press, 1990. The distortion correction circuit 16 distorts the image in such a manner as to correct for perspective. The corrected image appears as an approximation to a rear view without perspective as if viewed straight on.

Figure 3C:
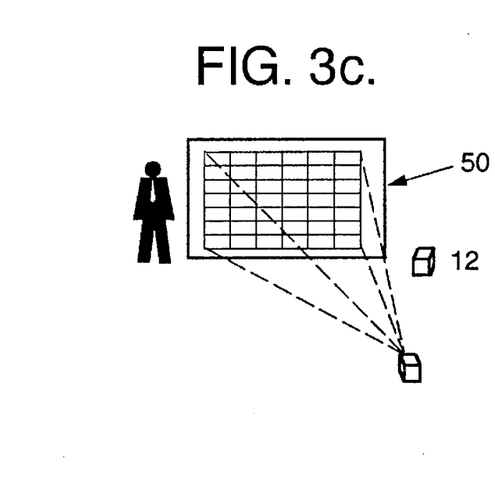
FIG. 3c shows a target that provides a grid of reference points which can be used to compute the transformation for correcting perspective distortion in accordance with the present teachings.

FIG. 3c shows a target 50, an image of which can be acquired during initial set-up of the system, that provides a grid of reference points which can be used to compute the transformation for correcting perspective distortion.

To enhance edges within the image and to reduce the effects of shadows and uneven illumination, the system 10 applies a Laplacian operator to the image. As illustrated in FIG. 1, the Laplacian operator may be implemented conventionally with a Laplace filter 18. For a general treatment on the topic, see pages 351–353 of *Fundamentals of Digital Image Processing*, by Anil K. Jain, published by Prentice Hall (1989).

Figure 4A:
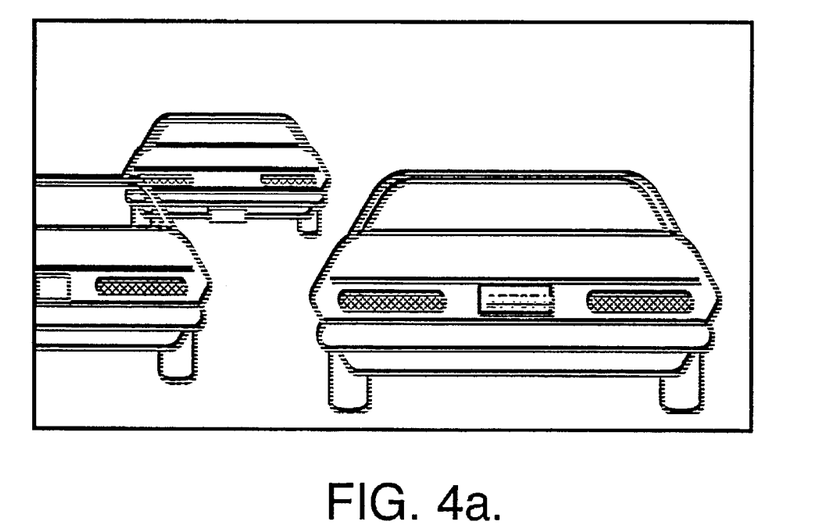
FIG. 4a shows the result of the application of a Laplacian operator to the image of FIG. 2.
Figure 4B:
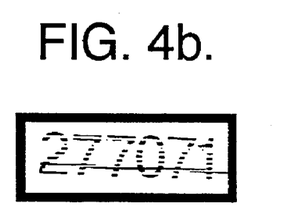
FIG. 4b is an enlargement of the image of a license plate containing a shadow.
Figure 4C:
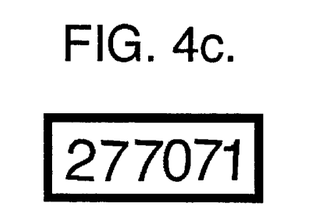
FIG. 4c shows the result of the application of the Laplacian on to the license plate of FIG. 4b.

FIG. 4a shows the result of the application of a Laplacian operator to the image of FIG. 2. FIG. 4b is an enlargement of the image of a license plate containing a shadow and FIG. 4c shows the result of the application of the Laplacian on to the license plate of FIG. 4b.

Figure 5:
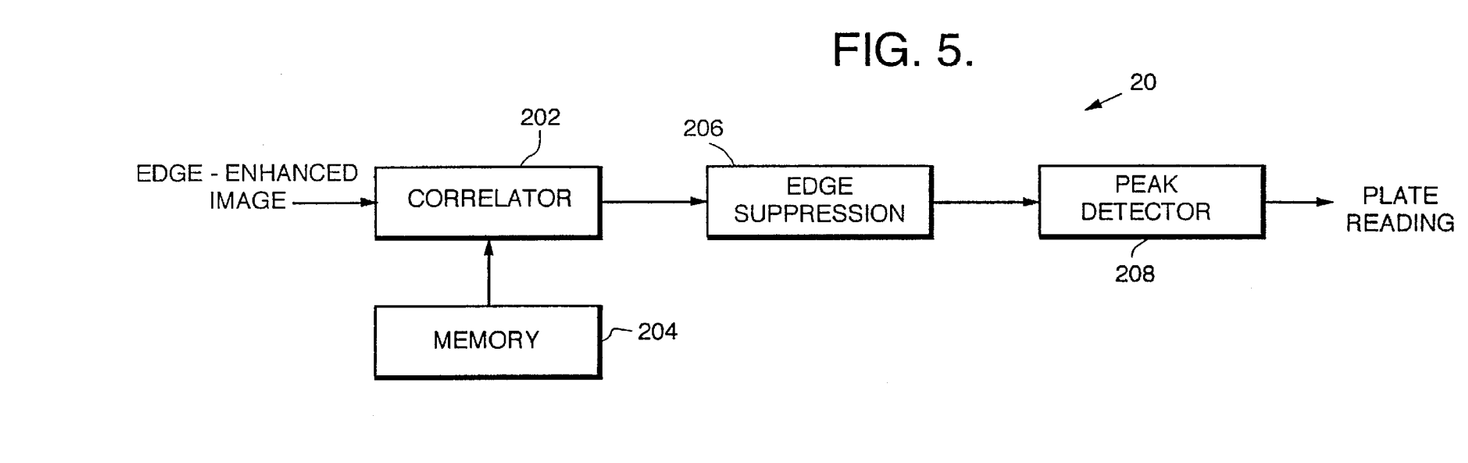
FIG. 5 is a block diagram of the first correlation system utilized in the present invention.

Returning to FIG. 1, the perspective corrected, edge-enhanced, shadow reduced image is processed by a first correlation system 20 to locate the license plate therein. FIG. 5 is a block diagram of the plate location correlation system 20 utilized in the present invention. The plate location correlation system 20 includes a conventional correlator 202 which correlates the perspective corrected, edge-enhanced, shadow reduced image with edge-enhanced idealized image of a license plate stored in a memory 204. The idealized plate image may be formed by aligning then averaging several images of a license plate of a single state. Idealized characters are then substituted into the resulting plate image. Each idealized character may be formed by taking a weighted average of a number reference characters, e.g., the 36 characters and numerals in the ASCII character set. Hence, each idealized character may be formed by taking a weighted average of 36 reference characters taken from high-resolution images of the same type of plates. In this case, all 36 reference characters were given the same weight. An alternative is, for each idealized character within the plate, to weight each reference character in proportion to its probability of occurrence. In the illustrative embodiment, edges within the idealized plate are enhanced by a Laplacian operator of the type described above.

Figure 5A:
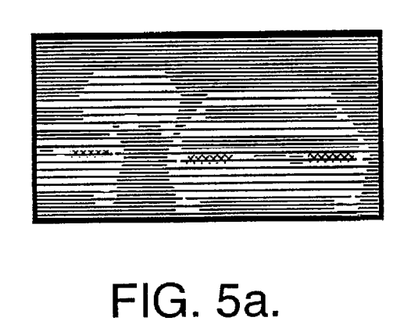
FIG. 5a is an image which represents the output of the correlation of the image of FIG. 4a with an edge-enhanced idealized image of a license plate in accordance with the teachings of the present invention.

The output of the correlator 202 is illustrated in FIG. 5a. FIG. 5a is an image which represents the output of the correlation of the image of FIG. 4a with an edge-enhanced idealized image of a license in accordance with the teachings of the present invention.

The correlation result shown is for the edge-enhanced image of FIG. 4a. Those skilled in the art will appreciate that many correlation schemes may be used for this purpose including grayscale and tri-level correlation. In any event, the correlation process requires the size and orientation of the idealized plate to closely match that of the plate in the input scene image. Likewise, the style (state/year) of the idealized plate must match that of the plate in the scene. To find plates of more than one style, the process of locating plates can simply be repeated once for each style, using a different plate template each time.

After the edges of the idealized plate are correlated with the input image, the correlation system 20 filters out long horizontal edges within the resulting correlation surface.

Figure 5B:
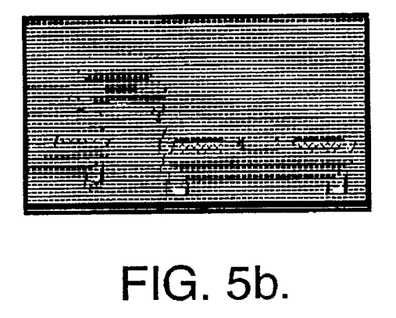
FIG. 5b represents the image of FIG. 5a after the suppression of long horizontal edges therein.
Figure 5C:
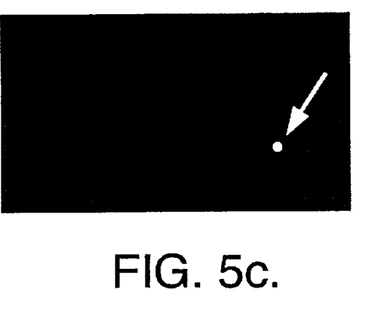
FIG. 5c illustrates the output of the peak detector of the plate location correlator utilized in the present invention.

FIG. 5b represents the image of FIG. 5a after the suppression of long horizontal edges therein and FIG. 5c illustrates the detected plate location as provided by a peak detector as discussed below. The suppression of long horizontal edges is performed by a second correlator 206 which, in the illustrative embodiment, is similar to the first correlator 202 with the exception that different weights are used. Long horizontal edges are suppressed to reduce false peaks that can occur in portions of the scene (such as in grooves along bumpers) that contain spatial frequencies matching those found in plate characters along the vertical direction (e.g. the vertical spacing of the grooves match the height of the characters) but not along the horizontal direction (i.e. these areas of horizontal grooves contain no vertical lines whose spacing matches the width of the characters). Filtering long horizontal edges out of the correlation surface is equivalent to filtering these edges out of the scene image. Therefore, if the system must find plates of more than one style, then it is most efficient to perform this filtering on the scene rather than on the correlation surface so that the filtering need not be repeated for each different plate template. Long horizontal lines may be filtered out by correlating with the kernel shown in FIG. 6a.

Figure 6A:
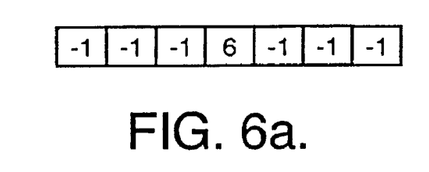
FIG. 6a represents a kernel used to suppress long horizontal edges out of the correlation surface of the plate location correlator utilized in the present invention.

FIG. 6a represents a kernel used to suppress long horizontal edges out of the correlation surface of the plate location correlator utilized in the present invention. The width of the kernel (seven pixels) is tailored to an expected plate size of 63 pixels in width and 35 pixels in height and was chosen to maximize the signal-to-noise ratio of the desired peak indicating the plate location. If the plate dimensions are increased by some factor, then the width of the kernel should likewise be increased by the same factor.

Figure 6B:
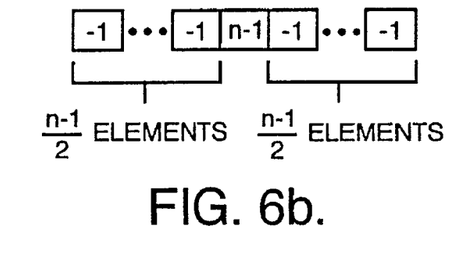
FIG. 6b shows a kernel for suppression of long horizontal edges (for the kernel having a length of n, where n must be odd).

FIG. 6b shows a kernel having a length of n, where n must be odd.

In addition to filtering out long horizontal lines, long lines of other orientations can be filtered out if desired. An alternative to explicitly filtering out long lines is to perform a matched filtering operation for a characteristic periodic pattern of peaks that is usually found at the plate location. Instead of filtering out long lines, this would filter out any structure that does not match that periodic pattern.

After the long horizontal edges are suppressed, the peaks in the correlation surface are detected by a conventional peak detector 208. As illustrated in FIG. 5c, the output of the peak detector 208 indicates the location of the license plate in the perspective corrected, edge-enhanced, shadow reduced input image. The result of the plate location process is to identify the pixels which represent the plate in the stored frame of data. This corresponds to a placement of a window around the license plate.

Returning to FIG. 1, the output of the plate location correlation system 20 is input to a second correlation system 22 for plate reading.

Figure 7:
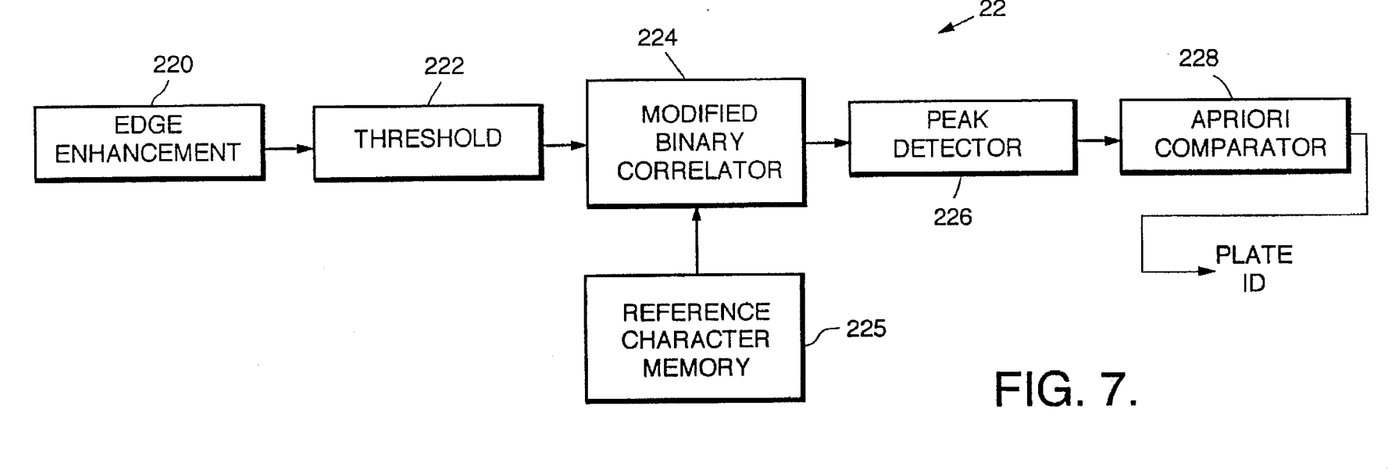
FIG. 7 is a block diagram of the plate reading correlation system.

FIG. 7 is a block diagram of the plate reading correlation system 22. The pixel data representing the license plate is edge enhanced by a second Laplacian operator 220 which may be constructed in the same manner as the first Laplacian operator 18 of FIG. 1. (It should be noted that the desired plate image may simply be extracted from the image of FIG. 4a. A second application of the Laplacian operator is not necessary.) The image output by the second Laplacian operator is represented in FIG. 8a.

Figures 8A, 8B, 8C, 8D:
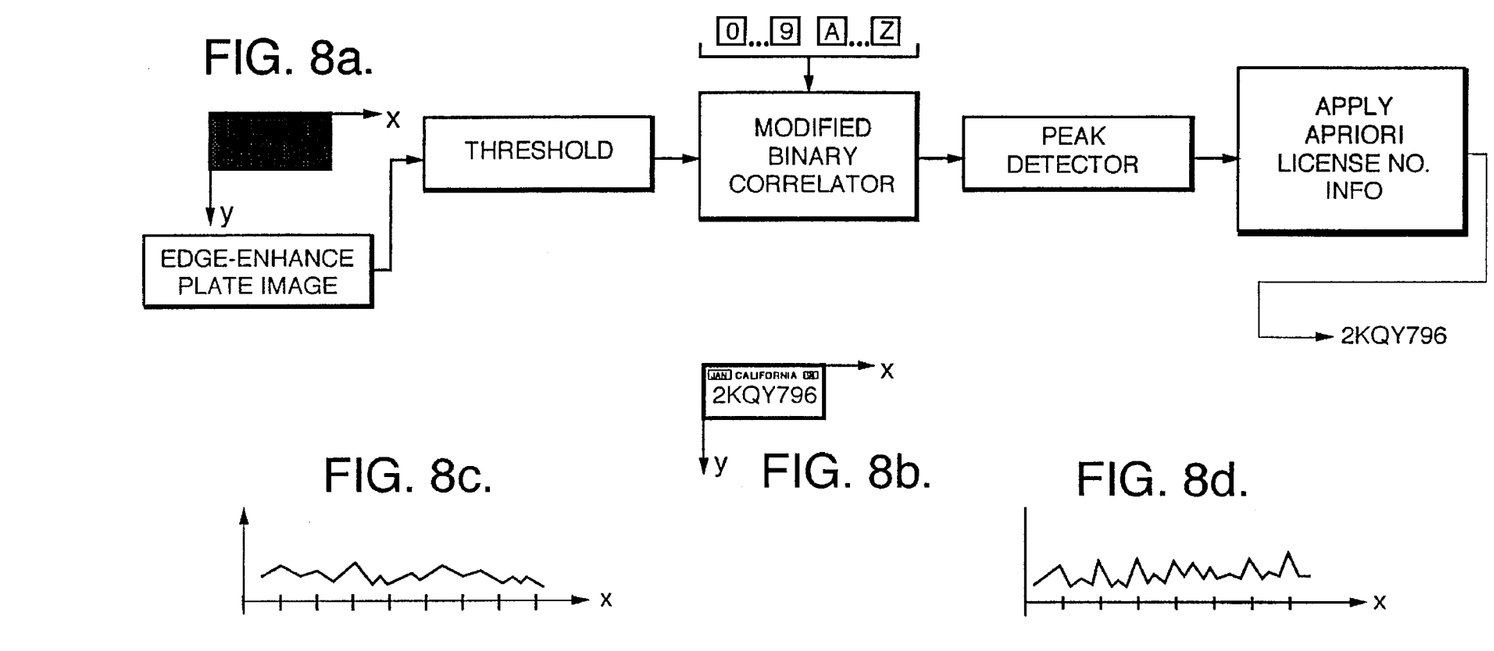
FIG. 8a is an image which represents the output of the second Laplacian operator of the license plate reading correlator utilized in the present invention.
FIG. 8b is an image which represents the output of the thresholding circuit of the license plate reading correlator utilized in the present invention.
FIG. 8c shows an illustrative correlation function for a reference character.
FIG. 8d shows an illustrative overall correlation function summed over all reference characters.
Figure 8E:
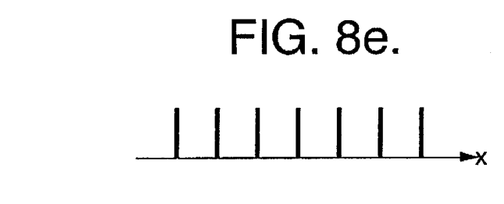
FIG. 8e is an illustrative impulse train.

FIG. 8a is an image which represents the output of the second Laplacian operator of the license plate reading correlator utilized in the present invention. This edge enhanced image is thresholded by a thresholding circuit 222 to convert the edge-enhanced version of the plate image from grayscale to binary form. This provides a binary plate image such as that illustrated in FIG. 8b to a third correlator 224.

FIG. 8b is an image which represents the output of the thresholding circuit of the license plate reading correlator utilized in the present invention FIG. 8c shows the correlator output and FIG. 8d illustrates correlation peaks provided by the peak detector of the license plate reading correlation system as discussed more fully below.

In the best mode, the third correlator 224 performs a modified binary correlation to correlate the binary image of the plate with the binary image of each reference character, numeral and/or symbol stored in a reference character memory 225. For a disclosure of maskable bilevel correlation, see U.S. Pat. No. 5,020,113, issued May 28, 1991 to Lo et al. and entitled Maskable Bilevel Correlators, the teachings of which are incorporated herein by reference.

Figure 9A:
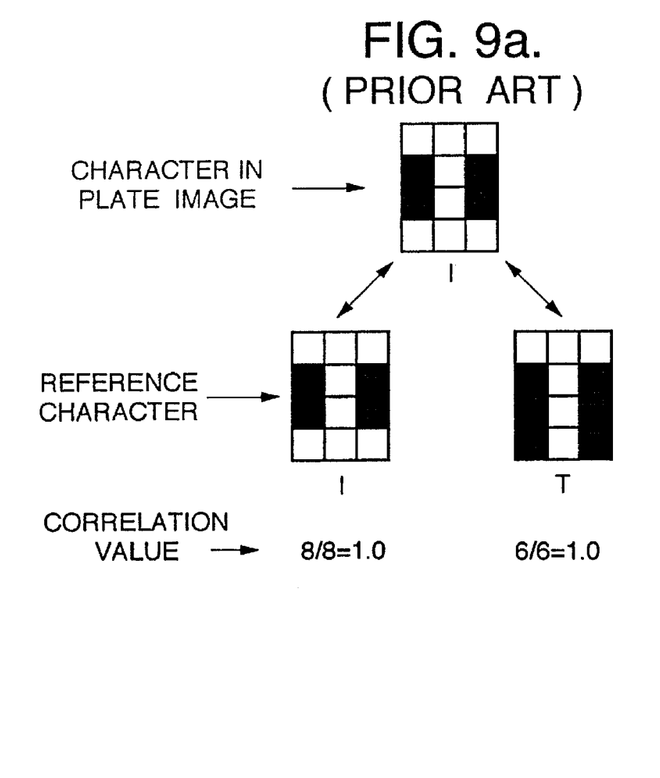
FIG. 9a illustrates the shortcomings of standard binary correlation.

FIG. 9a illustrates the shortcomings of standard binary correlation. As illustrated in FIG. 9a, with the standard binary correlation scheme, the correlation value is the percentage of pixels turned on in the reference character that match pixels turned on in the plate image. This type of correlation causes the character reading process to break down, however, when one character is a subset of another. For example, on California plates, the letter T is a subset of the letter I because the two differ only by the horizontal line at the base of the 'I'. Thus, the letter I on a license plate can contain 100% of the pixels turned on in the reference letter T, as well as 100% of the pixels turned on in the reference letter I providing no way to determine whether the character on the plate is an I or a T.

Figure 9B:
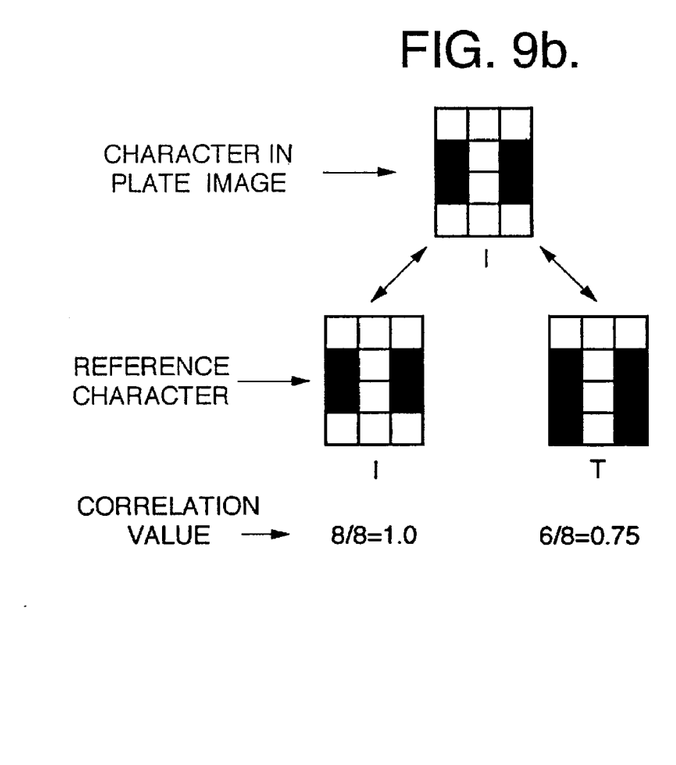
FIG. 9b illustrates the advantage of the modified binary correlation scheme utilized in the present invention.

FIG. 9b illustrates the advantage of the modified binary correlation scheme utilized in the present invention. The modified binary correlation process computes correlation as the percentage of pixels turned on in the union of the reference character and the plate image that match in both the reference character and plate images. Thus, a T will only partially match the I in the plate image, whereas an I will completely match the I in the plate image. Note that the above union is computed over the bounding rectangle of the reference character. Also note that both standard and modified binary correlation require that the size and tilt of the reference characters match that of the plate characters.

The remaining portion of the system 22 serves to (a) find the exact locations of plate characters and (b) determine the identity of each such character.

From the detected plate location, the system computes an estimate of possible character locations within the image. Note that there may be an expected error, or tolerance, associated with the detected plate location. Therefore, the set of possible character locations may not consist of a set of precise points, but may instead comprise a collection of regions in the image, within which characters are likely to occur.

The following procedure is performed for each reference character. First, the character is correlated with the image, over the entire set of possible character locations.

For a given x coordinate within the image, a character can appear no more than once. Therefore, for each x coordinate value, the system examines the character's correlation results. It searches for the highest correlation peak for that x coordinate, then saves that peak value. (The y coordinate of that peak can also be saved and later compared to that of other peaks, to help determine confidence in the peak.) All other correlation values for that x coordinate are then discarded.

The result, for that reference character, is correlation as a function of x. This is depicted in FIG. 8c. The system 22 then adds together all of the resulting correlation functions, for all of the reference characters, to determine overall correlation as a function of x. This is depicted in FIG. 8d.

Figure 8F:
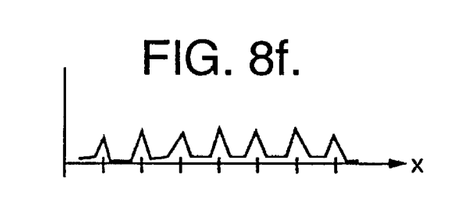
FIG. 8f illustrates the result of a convolution of the overall correlation function with the illustrative impulse train in which peaks represent detected character locations.

Next, the system 22 determines the exact x-coordinate of each character. This can be performed by correlating the overall function (FIG. 8d) with an impulse train such as that shown in FIG. 8e. The impulse train consists of pulses spaced at intervals corresponding to the expected separation between characters. As depicted in FIG. 8f, the x coordinates of the resulting peaks constitute detected character locations. Note that FIGS. 8c–8f are illustrative and contain no actual data.

The system 22 then identifies the character at each such location by finding which reference character has the highest correlation value at that location. If two or more characters have correlation values at such a location that are very close to the highest value, then an ambiguity exists.

The system 22 checks each resulting license plate number against a priori knowledge of valid license numbers. This a priori knowledge can include the maximum permissible number of license characters, a database of valid numbers, or rules governing the syntax of the numbers (for example, some positions are likely to contain alpha characters whereas others are likely to contain numeric characters, or are likely to have specific character values). If the detected license number is invalid according to a priori knowledge, then the system performs validity checks on the next strongest detected license number, and continues in this fashion until it either finds a strong valid match or determines that no such match can be found.

In addition to using a priori knowledge, synthetic discriminant functions (SDFs) can be used to improve performance by helping to distinguish between similar characters (such as between the characters 'B' and '8'). SDFs are correlation masks tailored to distinguish between a given pair (or set) of items. An overview of the use of SDFs is provided in a master's thesis entitled "Synthetic Discriminant Functions," by Victoria Gor of HMSC, published in 1991 by the California State University at Northridge.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for reading symbols including characters and numerals on a license plate mounted on a vehicle comprising:

camera means for providing an input image of said license plate, the camera means including a camera positioned to a side of the license plate so that said input image contains a lateral perspective distortion wherein a first side of the license plate is closer to the camera than a second side of the license plate;

means for warping said image to mitigate said lateral perspective distortion in said input image to provide a corrected image; and means for processing said corrected image to provide an output signal representative of the symbols on said license plate.

2. The system of claim 1, wherein the means for warping comprises a digital image warping circuit.

3. In a system for reading symbols including characters and numerals on a license plate mounted on a vehicle having a camera for providing an input image of the license plate, a system for locating the license plate on the vehicle comprising:

first means for providing an idealized edge template of a license plate by averaging a plurality of images of a license plate;

second means for providing an edge-enhanced version of the input image; and third means for correlating the idealized edge template of the license plate with the edge-enhanced version of the input image and locating the license plate on the vehicle based on the correlation.

4. The invention of claim 3 further including means for filtering edges within a correlation surface provided by said third means.

5. The invention of claim 4 further including means for locating peaks within the filtered correlation surface to provide an output representative of the location of the license plate on the vehicle.

6. A system for reading symbols including characters and numerals on a license plate mounted on a vehicle comprising:

camera means for providing an input image of said license plate, the camera means including a camera positioned to a side of the license plate so that said input image contains a lateral perspective distortion wherein a first side of the license plate is closer to the camera than a second side of the license plate;

means for warping said lateral perspective distortion in said input image to provide a corrected image;

means for applying a Laplacian operator to said corrected image to enhance edges and reduce the effects of shadows therein;

means for locating the license plate on the vehicle comprising:
first means for providing an idealized edge template of the license plate;
second means for providing an edge-enhanced version of the input image; and
third means for correlating the idealized edge template of the license plate with the edge-enhanced version of the input image; and means for reading the license plate comprising:
means for storing said input image in memory;
means for storing images of reference symbols in memory; and
means for correlating said input image with said images of symbols to provide output signals indicative of the symbols on said license plate.

7. The invention of claim 6 further including means for correlating said output signals indicative of the symbols on said license plate with valid license plate symbols to improve a confidence rating of said output signals.

8. A method for reading symbols including characters and numerals on a license plate mounted on a vehicle comprising the steps of;

providing an input image of said license plate using a camera positioned to a side of the license plate, said input image containing lateral perspective distortion resulting from a first side of the license plate being closer to the camera than a second side of the license plate;

warping said input image to mitigate said lateral perspective distortion to provide a corrected image; and processing said corrected image to provide an output signal representative of the symbols on said license plate.

9. In a system for reading symbols including characters and numerals on a license plate mounted on a vehicle having a camera for providing an input image of the license plate, a method for locating the license plate on the vehicle comprising the steps of:

providing an idealized edge template of the license plate by averaging a plurality of images of a license plate;

providing an edge-enhanced version of the input image;

correlating the idealized edge template of the license plate with the edge-enhanced version of the input image to provide a correlation surface; and locating the license plate on the vehicle based on the correlation surface.

10. The invention of claim 9 further including the step of filtering edges within said correlation surface.

11. The invention of claim 10 further including the step of locating peaks within the filtered correlation surface to provide an output representative of the location of the license plate on the vehicle.

12. A method for reading symbols including characters and numerals on a license plate mounted on a vehicle comprising the steps of:

providing an input image of said license plate using a camera positioned to a side of the license plate, said input image containing lateral perspective distortion resulting from a first side of the license plate being closer to the camera than a second side of the license plate;

mitigating said lateral perspective distortion in said input image to provide a corrected image by warping same;

applying a Laplacian operator to said corrected image to enhance edges and reduce the effects of shadows therein;

locating the license plate on the vehicle further including the steps of:
providing an idealized edge template of the license plate;
providing an edge-enhanced version of the input image; and
correlating the idealized edge template of the license plate with the edge-enhanced version of the input image and locating the license plate on the vehicle; and reading the license plate, further including the steps of:
storing said input image in memory;
storing images of reference symbols in memory; and
correlating said input image with said images of symbols to provide output signals indicative of the symbols on said license plate.

13. The invention of claim 12 further including the step of correlating said output signals indicative of the symbols on said license plate with valid license plate symbols to improve a confidence rating of said output signals.

14. A system for reading symbols including characters and numerals on a license plate mounted on a vehicle comprising camera means for providing an input image of said license plate, the camera means including a camera positioned to one side of the license plate so that said input image contains a lateral perspective distortion wherein a first side of the license plate is closer to the camera than a second side of the license plate;

means for warping said image to mitigate said lateral perspective distortion in said input image to provide a corrected image;

means for processing said corrected image to provide an output signal representative of the symbols on said license plate;

means for providing an idealized edge template of the license plate;

means for providing an edge-enhanced version of the input image; and means for correlating the idealized edge template of the license plate with the edge-enhanced version of the input image to provide at least one signal indicative of the location of the license plate.

* * * * *